Dec. 16, 1958 R. L. PEARSON, JR 2,864,294
POWER DISC SPIKER
Filed Jan. 13, 1956 3 Sheets-Sheet 1
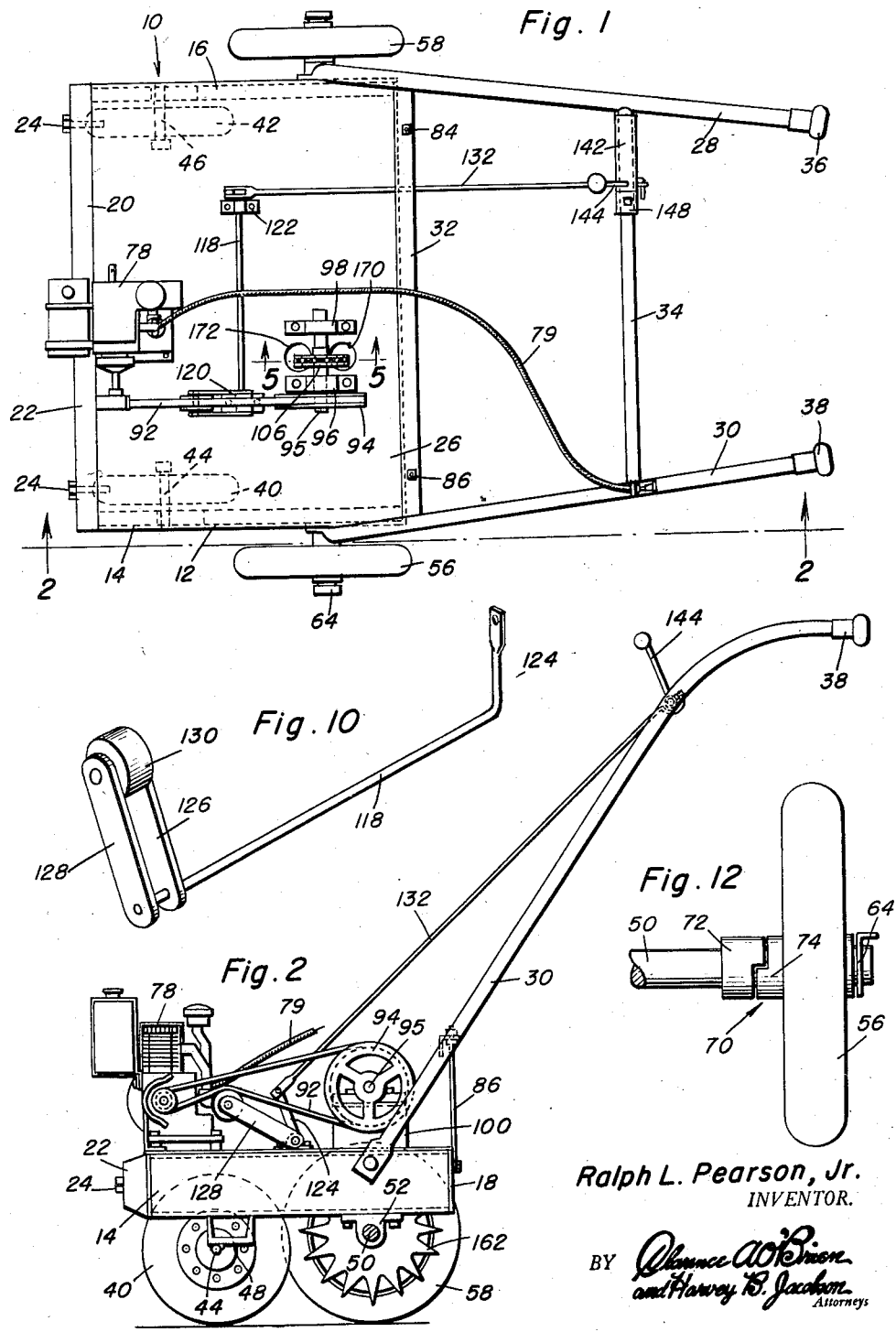
Ralph L. Pearson, Jr.
INVENTOR.
BY *[signatures]*
Attorneys

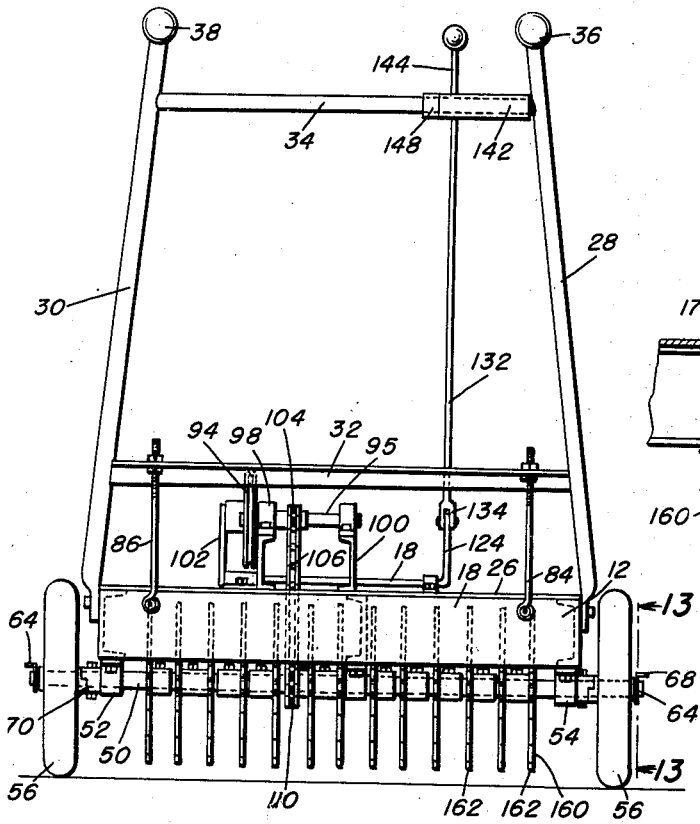
Fig. 3
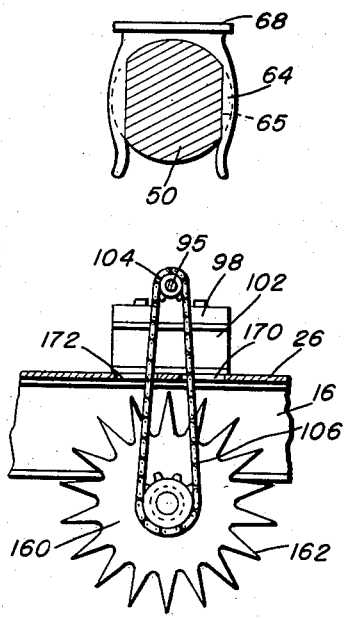
Fig. 13
Fig. 5
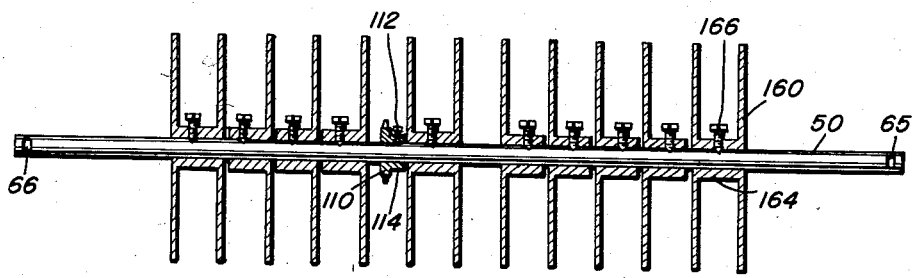
Fig. 6
Ralph L. Pearson, Jr.
INVENTOR.

Dec. 16, 1958     R. L. PEARSON, JR     2,864,294
POWER DISC SPIKER
Filed Jan. 13, 1956     3 Sheets-Sheet 3
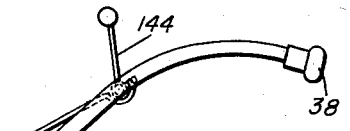
Fig. 4
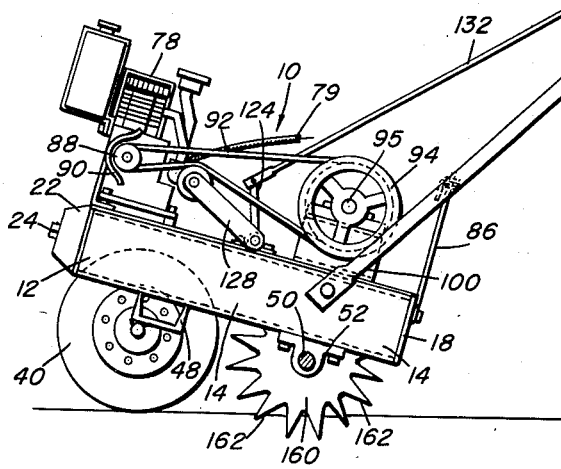
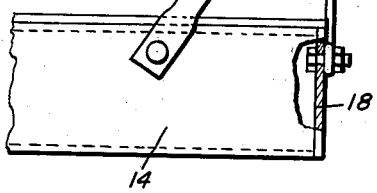
Fig. 7
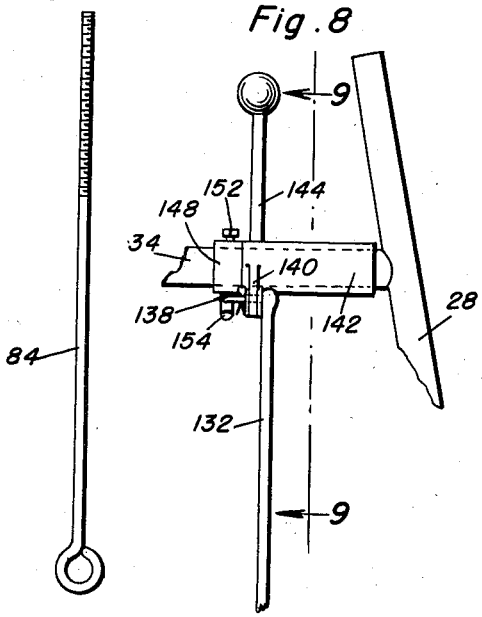
Fig. 11    Fig. 8
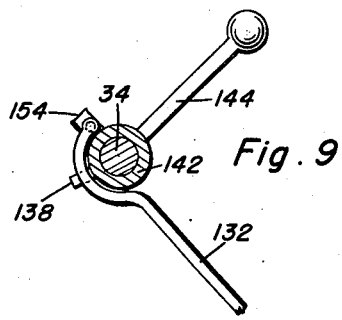
Fig. 9
Ralph L. Pearson, Jr.
INVENTOR.
BY *Clarence A. O'Brien*
*and Harvey B. Jacobson*
Attorneys

United States Patent Office 2,864,294
Patented Dec. 16, 1958

2,864,294

POWER DISC SPIKER

Ralph L. Pearson, Jr., Walters, Okla.

Application January 13, 1956, Serial No. 558,932

2 Claims. (Cl. 172—42)

This invention relates to a power driven turf penetrating machine for the care of lawn areas, particularly golf courses including their putting greens as well as fairways.

It is the common practice to aerate soil. There are various equipments available to perform quite deep penetration of the turf for the purpose of aerating. It is an object of the present invention to provide a power driven machine for penetrating the soil in such a manner that it does not penetrate deeply for the usual aeration purposes. The present invention provides a machine which is to be used as a companion to the aerators and is not to be considered as a substitute for them.

In the treatment and care of lawn areas, particularly golf courses, there are several conditions which are overcome by spiking the turf. Such spiking relieves localized dry spots, increases moisture infiltration, relieves compaction at the immediate surface and permits oxygen and moisture to enter the soil without interfering with the golf play. In addition the superficial penetration helps to break up the algae and is a tool to be used before the application of hydrated lime. Shallow penetration of the turf is ideal for preparing compacted areas prior to seeding and after seeding in order to disc spike the seed in the turf. Such turf treatment is ideal for top dressing so that the top dressing material will adhere to the soil below it. The same results are obtained in the use of fungicides, insecticides and herbicides when preceded by spiking, as it allows penetration of the mat and thatch reaching the probable source of infection. Finally, superficial turf penetration lets air into a wet green which will in many cases prevent the turf from dying. Accordingly, another object of the invention is to provide a power driven machine for serving the above functions, the machine being conveniently handled inasmuch as it is provided with demountable rear wheels, the use of which supports the spike in an elevated position, and upon removal of the demountable wheels, the spike discs support the machine whereupon actuation of the motor on the machine the spike discs function as drive wheels therefor.

A more specific object of the invention is to provide a machine for superficially piercing the turf as opposed to deep forms of aeration, the machine being compact and very easily controllable and manipulatable inasmuch as it includes a single motor for driving the machine by actuating in an axle that is common to the spiked discs and the demountable wheels when they are located on the axle, there being a novel drive connection between the motor and the axle, this novel drive means including a manually operable clutch at the disposal of the user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of an embodiment of the invention;

Figure 2 is a sectional view taken on the line 2—2 of Figure 1 and showing largely the machine in elevation;

Figure 3 is a rear view of the machine of Figure 1;

Figure 4 is a sectional view similar to that of Figure 2 with the rear, demountable wheels separated from the machine;

Figure 5 is a fragmentary sectional view in an enlarged scale and taken on the line 5—5 of Figure 1;

Figure 6 is a longitudinal sectional view of the means for piercing the turf mounted on the rear axle of the machine;

Figure 7 is a fragmentary sectional view showing particularly the means for aiding in the attachment of the handles to the frame;

Figure 8 is a fragmentary part of the clutch control mechanism;

Figure 9 is a sectional view taken on the line 9—9 of Figure 8;

Figure 10 is a perspective view of another part of the clutch mechanism;

Figure 11 is an elevational view of a support used in connection with the handles;

Figure 12 is a fragmentary elevational view of a wheel clutch for one of the demountable rear wheels; and Figure 13 is an enlarged sectional view taken on the line 13—13 of Figure 3.

The turf piercing machine 10 which exemplifies the invention, comprises a generally rectangular frame 12 which has sides 14 and 16 together with a rear frame member 18 and a front frame member 20. An elongated weight 22 is bolted as at 24 to the front frame member 20. Panel 26 is disposed on the frame and is welded or otherwise rigidly fixed in place. Handles 28 and 30 are bolted or otherwise pivotally secured at their inner ends to the sides 14 and 16. A cross member 32 is welded or otherwise fixed to the handles 28 and 30. An upper cross member 34 is also similarly fixed to the handles 28 and 30 near the resilient caps 36 and 38 at the outer extremities of the handles.

Front, inboard wheels 40 and 42 are mounted for rotation on spindles 44 and 46 respectively. Each spindle is welded or otherwise fixed to a hanger 48 which is secured to sides 14 and 16, and which depends therefrom. An axle 50 is mounted for rotation in bearings 52 and 54, the latter being bolted or otherwise secured to the bottom of the frame 12. Demountable outboard wheels 56 and 58 are disposed on the axle 50, each wheel being held in place by an identical fastener (Figure 13). The fastener consists of a U-shaped clip 64 whose sides fit in slots 65 and 66 in the axle 50. A lateral flange 68 is disposed at the top of the clip to facilitate the removal thereof. When the clip is disposed on place on the axle 50 its wheel cannot be separated from the axle and moreover the clip functions to hold the clutch 70 (Figure 12) engaged.

Clutch 70 consists of a clutch element 72 that is fixed to the axle 50, together with a second clutch element 74 that is fixed to its wheel, for example wheel 56. The clutch elements have mating offsets which when engaged, prevent mutual rotation between the clutch elements.

There is a motor 78 mounted on the panel 26, motor 78 being preferably an internal combustion engine. A Bowden wire 79 extends from the carburetor of the engine 78 and terminates at a convenient location on one of the handles 30. These handles are adjustable and therefore a Bowden wire 79, which is flexible, functions to transmit motion to the carburetor control linkage regardless of the adjustment of the handles 28 and 30. The adjustment of these handles is obtained by two eye bolts 84 and 86, whose eyes are bolted to the rear frame member 18 and whose threaded opposite ends are passed through apertures in the handle cross member 32. Nuts on both sides of the cross member 32 holds the pair of handles 28 and 30 in the selected adjustment desired by the user of the machine.

Means drivingly connecting the motor to the axle 50 are operatively associated with both. The preferred means consists of a drive pulley 88 behind guard 90 that is carried adjacent to the pulley. A flexible driving element, for example belt 92 is entrained around the pulley 88 and around a larger pulley 94. This latter pulley is fixed to a lay shaft 95, the latter being mounted in bearings 96 and 98 at the upper ends of supports 100 and 102. Sprocket 104 is fixed to the lay shaft 95 and has a chain 106 entrained around it. This chain is also entrained around another sprocket 110 that is fixed by a set screw 112 passed through the collar 114 thereof, to the axle 50. Therefore upon actuation of the motor 78, axle 50 is rotated through the intermediate drive connecting means. Belt 92 functions as a part of a clutch inasmuch as it is entrained loosely around pulleys 88 and 94. When a drive connection between the motor 78 and the lay shaft 95 is desired, belt 92 is tightened. This is accomplished by oscillating the crank 118, the latter being mounted in bearings 120 and 122 respectively. These bearings are bolted or otherwise fixed to the panel 26 on frame 12. One end of crank 118 has a crank arm 124 fixed to it, while the opposite end has a pair of arms 126 and 128 fixed to it. A roller 130 is mounted for rotation between the pair of arms 126 and 128, and this roller is adapted to contact the outer surface of the belt 92 in order to take up the slack therein and establish a drive connection between the two pulleys 88 and 94. A link 132 is pivoted to crank arm 124, preferably by having a bifurcated end 134 pivoted on the crank arm. The upper end of link 132 has a pin 138 protruding laterally therefrom, this pin being passed through an aperture in ear 140. Ear 140 extends laterally from the sleeve 142, the latter being mounted for oscillation on the cylindrical cross member 34 between handles 28 and 30. A cotter key or like fastener is used to hold the pin 138 within the aperture in ear 140. An operating handle 144 is fixed to the sleeve 142 in order to oscillate it. Upon oscillation of sleeve 142 the link 132 is reciprocated thereby actuating the crank 118 which ultimately imparts motion to the roller 130 so as to bring it against the belt 92 or separate it therefrom. A collar 148 is disposed on the cross member 34 and has a set screw 150 carried thereby. This set screw is used to hold the collar 148 in a selected, adjusted position. Stop 154 is fixed to the collar 148 and is contacted by the pin 138 in order to limit the motion of the sleeve 142 in one direction.

The turf piercing means consist of a number of discs 160 that are fixed to the axle 50 between its ends. Each disc has a plurality of peripheral spikes 162 which act to pierce and penetrate the turf. As seen in Figure 6 the discs are formed with hubs 164 in which a set screw 166 is threaded. The set screw bears against the surface of the axle 50 in order to hold the hub and hence, the disc associated with it, in place on the axle. There are single and double disc hubs on the axle 50, this being a manufacturing expedient in order to arrive at equally spaced discs which make up the entire group of discs. Other manufacturing expedients which achieve the same results may be resorted to in this regard.

In operation the walking attendant drives the machine 10 to the area on which he is to work. This is done by using the motor 78 which drives, through the belt 92 and chain 106, the latter passing through a pair of apertures 170 and 172 in plate 26 to the axle 50 to which it is drivingly connected. Inasmuch as demountable wheels 56 and 58 are on axis 50 at this time, and are drivingly connected to the axle by clutches 70, wheels 56 and 58 drive the machine to the destination thereof. Then, the demountable wheels 56 and 58 are removed by separating the clips 74 from their slots 65 and 66 in axle 50. The weight of the machine comes to bear upon the spiked disc and the clutch lever 144 is moved. This, through the intermediate structure which has been described previously, tightens the belt 92 and establishes a driving connection between the motor and the axle 50 to which the turf piercing means are secured. This drives the machine forward, the driving being done by the turf piercing means thereby avoiding burned grass which is often the result of using separate drive wheels.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a turf piercing machine for the care of smooth lawns and which includes a frame, and an engine carried by said frame, an inboard pair of front wheels mounted for rotation on said frame and located beneath said engine, and a pair of handles secured to said frame and protruding rearwardly for a walking attendant, a rear axle, bearings secured to said frame in which said axle is mounted for rotation, spiked turf penetrating means adjustably secured to said axle intermediate and spaced from the ends thereof, said turf penetrating means being adapted to at least partially support the weight of the machine, means drivingly connecting said engine with said axle, outboard demountable wheels of larger diameter than said turf penetrating means carried by the ends of said axle, said engine and axle driving connecting means including a lay shaft, means mounting said lay shaft on said frame for rotation, means including a flexible drive element connecting said lay shaft and said engine, a clutch operatively connected to said flexible drive element, and means drivingly connecting said lay shaft with said axle.

2. The machine of claim 1 wherein the last mentioned means comprises a flexible drive element, means respectively on said lay shaft and said axle to which said flexible drive element is attached, said frame including a plate having an aperture through which the last-mentioned flexible drive element passes when extending from said lay shaft to said axle, and a counterweight separably secured on said frame and in advance of said front wheels.

References Cited in the file of this patent

UNITED STATES PATENTS

| 1,996,510 | Glasier | Apr. 2, 1935 |
| 2,051,443 | Gravely | Aug. 18, 1936 |
| 2,229,497 | Dontje | Jan. 21, 1941 |
| 2,379,805 | Johnston | July 3, 1945 |
| 2,464,038 | Horth | Mar. 8, 1949 |
| 2,691,933 | Emerson | Oct. 19, 1954 |

FOREIGN PATENTS

| 154,008 | Australia | Nov. 9, 1953 |
| 1,050,584 | France | Jan. 8, 1954 |
| 804,381 | Germany | Apr. 23, 1951 |
| 849,930 | Germany | Sept. 18, 1952 |